3,828,043
5-ACYL BARBITURIC ACID DERIVATIVES
Ian Trevor Kay, Finchampstead, Frederick Charles Peacock, Ascot, and Wilson Shaw Waring, Macclesfield, England, assignors to Imperial Chemical Industries Limited, London, England
No Drawing. Filed June 22, 1971, Ser. No. 155,645
Claims priority, application Great Britain, July 2, 1970, 32,098/70
Int. Cl. C07d 51/20
U.S. Cl. 260—257    5 Claims

ABSTRACT OF THE DISCLOSURE

A compound having the formula:

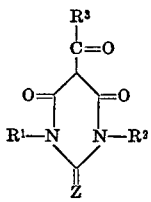

wherein $R^1$ and $R^2$ represent hydrogen, alkyl of up to 6 carbon atoms, allyl, cyclohexyl, phenyl, benzyl, phenylallyl or furyl-allyl, $R^3$ represents alkyl of up to 6 carbon atoms, allyl, cyclohexyl, phenyl, benzyl, phenylallyl or furyl-allyl, and Z represents an oxygen or sulphur atom provided that Z is sulphur when both $R^1$ and $R^2$ are hydrogen, methyl or ethyl and $R^3$ is methyl. The compounds are useful in combatting plant pests.

This invention relates to heterocyclic compounds, to methods for preparing them, to compositions comprising them, and to methods of combating pests using them.

Accordingly the invention provides a compound having the formula:

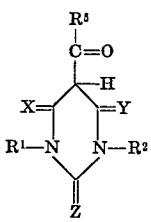

and salts, complexes, enol ethers or enol esters thereof, wherein X, Y and Z which may be the same or different, represent atoms of oxygen or sulphur; $R^1$, $R^2$ and $R^3$ represent hydrogen atoms or unsubstituted or substituted hydrocarbyl groups.

In a preferred aspect the invention provides a compound having the formula:

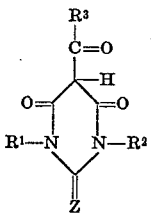

and salts, complexes, enol ethers or enol esters thereof, wherein $R^1$, $R^2$ and $R^3$ represent hydrogen atoms or unsubstituted or substituted hydrocarbyl groups and Z represents an atom of oxygen or sulphur.

In a more preferred aspect the invention provides a compound having the formula:

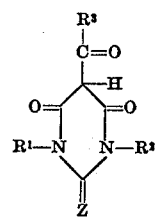

and salts, complexes, enol ethers and enol esters thereof, wherein $R^1$, $R^2$, and $R^3$ represent hydrogen atoms, or alkyl, alkenyl, cycloalkyl, aryl, alkaryl, aryl-substituted alkenyl or furyl-substituted alkenyl groups, and Z represents an oxygen or sulphur atom.

In an even more preferred aspect of the invention provides a compound having the formula:

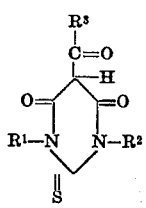

and salts, complexes, enol ethers or enol esters thereof, wherein $R^1$, $R^2$ and $R^3$ represent alkyl, alkenyl, or aryl groups.

In an especially preferred aspect of this invention provides a compound having the formula:

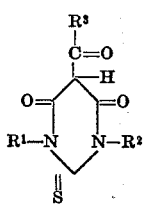

wherein $R^1$ and $R^2$ represent alkyl groups comprising up to 6 carbon atoms, or allyl groups, and $R^3$ represents an alkyl group comprising up to 9 carbon atoms.

Specific compounds according to the present invention are those given in Table I below, together with a physical characteristic for each compound, usually the melting point for solid compounds expressed in degrees centigrade, or the refractive index for liquid compounds.

It will be apparent to those skilled in the art that the compounds may exist in more than one tautomeric form and the scope of the present invention is to be taken as including all tautomeric forms and stereoisomeric forms of the invention compounds. Examples of such tautomeric and isomeric forms include those illustrated by the following structural formula:

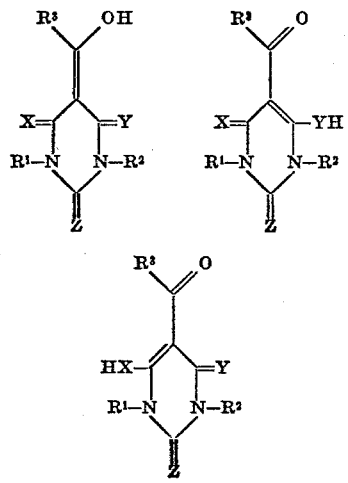

If the group $R^3$ in the above formula represents a group $R^4R^5CH$ where $R^4$ and $R^5$ represent atoms of hydrogen or halogen or unsubstituted or substituted hydrocarbyl groups then further isomeric and tautomeric forms are possible, for example, the following:

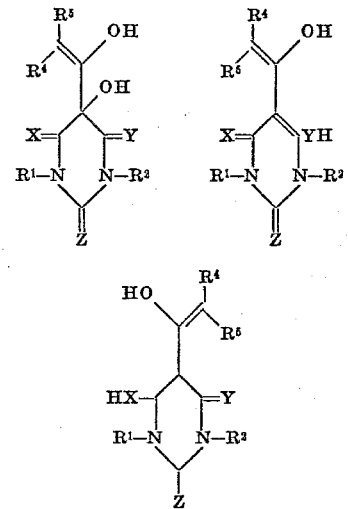

TABLE 1

| Compound No. | $R^1$ | $R^2$ | $R^3$ | Z | Physical characteristic |
|---|---|---|---|---|---|
| 1 | $CH_3$ | $CH_3$ | $CH_3$ | S | M.P. 86–87°. |
| 2 | $CH_3$ | $CH_3$ | $CH_3CH(CH_3)_2$ | S | M.P. 55°. |
| 3 | $CH_3$ | $CH_3$ | $C_2H_5$ | S | M.P. 76–77°. |
| 4 | $CH_3$ | $CH_3$ | $n$-$C_3H_7$ | S | M.P. 66–67°. |
| 5 | $CH(CH_3)_2$ | $CH_3$ | $CH_3$ | S | M.P. 49°. |
| 6 | $C_2H_5$ | $CH_3$ | $CH_3$ | S | M.P. 72°. |
| 7 | $C_2H_5$ | $CH_3$ | $C_2H_5$ | S | M.P. 51°. |
| 8 | $CH_3$ | $CH_3$ | $C_6H_5$ | S | M.P. 105–106°. |
| 9 | $C_6H_5$ | $CH_3$ | $CH_3$ | S | M.P. 125°. |
| 10 | $CH_3$ | $CH_3$ | $n$-$C_5H_{11}$ | S | M.P. 35°. |
| 11 | $CH_3$ | $CH_3$ | $n$-$C_9H_{19}$ | S | M.P. 49°. |
| 12 | $CH_2CH(CH_3)_2$ | $CH_3$ | $CH_3$ | S | M.P. 64°. |
| 13 | $n$-$C_3H_7$ | $CH_3$ | $CH_3$ | S | M.P. 40°. |
| 14 | $n$-$C_4H_9$ | $CH_3$ | $CH_3$ | S | M.P. 64–65°. |
| 15 | $C_2H_5$ | $C_2H_5$ | $CH_3$ | S | M.P. 44°. |
| 16 | $n$-$C_3H_7$ | $CH_3$ | $C_2H_5$ | S | M.P. 56°. |
| 17 | $C_2H_5$ | $C_2H_5$ | $C_2H_5$ | S | M.P. 70–72°. |
| 18 | $n$-$C_4H_9$ | $CH_3$ | $C_2H_5$ | S | M.P. 38°. |
| 19 | $n$-$C_3H_7$ | $CH_3$ | $n$-$C_3H_7$ | S | M.P. 38°. |
| 20 | $n$-$C_4H_9$ | $CH_3$ | $n$-$C_3H_7$ | S | M.P. 37°. |
| 21 | $C_2H_5$ | $C_2H_5$ | $n$-$C_3H_7$ | S | M.P. 28–29°. |
| 22 | $n$-$C_4H_9$ | $CH_3$ | $CH_2C_6H_5$ | S | M.P. 105°. |
| 23 | Cyclohexyl | $CH_3$ | $CH_3$ | S | M.P. 105–107°. |
| 24 | $n$-$C_3H_7$ | $CH_3$ | $n$-$C_4H_9$ | S | M.P. 43–44°. |
| 25 | $n$-$C_4H_9$ | $CH_3$ | $n$-$C_4H_9$ | S | M.P. 32–33°. |
| 26 | $CH(CH_3)_2$ | $C_2H_5$ | $CH_3$ | S | $n_D^{25}$ 1.5962. |
| 27 | Cyclohexyl | $CH_3$ | $n$-$C_3H_7$ | S | M.P. 69–70°. |
| 28 | Cyclohexyl | $CH_3$ | $C_2H_5$ | S | M.P. 67–68°. |
| 29 | $CH_3$ | $CH_3$ | $n$-$C_4H_9$ | S | M.P. 27–28°. |
| 30 | $CH_2CH=CH_2$ | $CH_3$ | $CH_3$ | S | $n_D^{23}$ 1.6184. |
| 31 | $CH_2CH=CH_2$ | $CH_3$ | $n$-$C_3H_7$ | S | $n_D^{23}$ 1.5986. |
| 32 | $n$-$C_3H_7$ | $CH_3$ | $n$-$C_5H_{11}$ | S | $n_D^{23}$ 1.5669. |
| 33 | $n$-$C_5H_{11}$ | $CH_3$ | $CH_3$ | S | M.P. 39–40°. |
| 34 | $n$-$C_3H_7$ | $n$-$C_3H_7$ | $CH_3$ | S | M.P. 61°. |
| 35 | $CH_3$ | $CH_3$ | $CH(CH_3)_2$ | S | M.P. 73–74°. |
| 36 | $n$-$C_3H_7$ | $CH_3$ | $CH(CH_3)_2$ | S | $n_D^{23}$ 1.5910. |
| 37 | $C_2H_5$ | $C_2H_5$ | $CH(CH_3)_2$ | S | $n_D^{27}$ 1.5878. |
| 38 | $CH_3$ | $CH_3$ | $C(CH_3)_3$ | S | M.P. 59–60°. |
| 39 | $C_2H_5$ | $C_2H_5$ | $n$-$C_4H_9$ | S | Viscous oil. |
| 40 | $n$-$C_3H_7$ | $C_2H_5$ | $CH_3$ | S | M.P. 54–57°. |
| 41 | $C_2H_5$ | $CH_3$ | $CH(CH_3)_2$ | S | $n_D^{23}$ 1.6055. |
| 42 | $CH_2CH=CH_2$ | $CH_3$ | $C_2H_5$ | S | M.P. 37–38°. |
| 43 | $CH_2CH=CH_2$ | $CH_3$ | $n$-$C_4H_9$ | S | $n_D^{20}$ 1.5980. |
| 44 | $CH(CH_3)_2$ | $CH_3$ | $C_2H_5$ | S | M.P. 57–58°. |
| 45 | $CH(CH_3)_2$ | $CH_3$ | $CH(CH_3)_2$ | S | $n_D^{22}$ 1.5975. |
| 46 | $CH(CH_3)_2$ | $CH_3$ | $n$-$C_4H_9$ | S | $n_D^{23}$ 1.5880. |
| 47 | $CH(CH_3)_2$ | $CH_3$ | $n$-$C_3H_7$ | S | $n_D^{26}$ 1.5960. |
| 48 | $CH_3$ | $CH_3$ | Cyclohexyl | S | M.P. 111–112°. |
| 49 | $C_2H_5$ | $CH_3$ | $n$-$C_4H_9$ | S | M.P. 32–33°. |
| 50 | $n$-$C_5H_{11}$ | $CH_3$ | $n$-$C_3H_7$ | S | $n_D^{23}$ 1.5790. |
| 51 | $n$-$C_4H_9$ | $CH_3$ | $CH(CH_3)_2$ | S | $n_D^{23}$ 1.5843. |
| 52 | $CH(CH_3)_2$ | $C_2H_5$ | $C_2H_5$ | S | $n_D^{23}$ 1.5962. |
| 53 | $CH(CH_3)_2$ | $C_2H_5$ | $n$-$C_3H_7$ | S | $n_D^{24}$ 1.5879. |
| 54 | $n$-$C_4H_9$ | $CH_3$ | $n$-$C_5H_{11}$ | S | $n_D^{24}$ 1.5703. |
| 55 | $n$-$C_5H_{11}$ | $CH_3$ | $C_2H_5$ | S | M.P. 42–43°. |
| 56 | $n$-$C_6H_{13}$ | $CH_3$ | $CH_3$ | S | M.P. 53–55°. |
| 57 | $n$-$C_6H_{13}$ | $CH_3$ | $C_2H_5$ | S | M.P. 43–44°. |
| 58 | $n$-$C_5H_{11}$ | $CH_3$ | $n$-$C_4H_9$ | S | M.P. 25°. |
| 59 | $n$-$C_6H_{13}$ | $CH_3$ | $n$-$C_4H_9$ | S | $n_D^{24}$ 1.5614. |
| 60 | $n$-$C_6H_{13}$ | $CH_3$ | $n$-$C_3H_7$ | S | M.P. 25°. |
| 61 | $CH_3$ | $CH_3$ | $CH=CHC_6H_5$ | S | M.P. 209–210°. |
| 62 | $CH_3$ | $CH_3$ | $CH=CHCH(CH_3)_2$ | S | M.P. 88–89°. |
| 63 | $CH_3$ | $CH_3$ | $CH=CH$—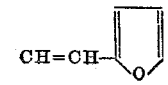 | S | M.P. 216–217°. |

TABLE 1—Continued

| Compound No. | R¹ | R² | R³ | Z | Physical characteristic |
|---|---|---|---|---|---|
| 64 | Cyclohexyl | CH₃ | CH(CH₃)₂ | S | Viscous oil. |
| 65 | Cyclohexyl | CH₃ | n-C₄H₉ | S | M.P. 63-64°. |
| 66 | Cyclohexyl | CH₃ | n-C₅H₁₁ | S | Viscous oil. |
| 67 | H | n-C₃H₇ | CH₃ | S | M.P. 158-159°. |
| 68 | H | n-C₃H₇ | C₂H₅ | S | M.P. 154-155°. |
| 69 | H | n-C₃H₇ | n-C₃H₇ | S | M.P. 114-116°. |
| 70 | H | n-C₃H₇ | n-C₄H₉ | S | M.P. 124-125°. |
| 71 | CH₃ | CH₃ | C₂H₅ | O | M.P. 59°. |
| 72 | CH₃ | CH₃ | n-C₃H₇ | O | M.P. 14-16°. |
| 73 | CH₃ | CH₃ | n-C₄H₉ | O | M.P. 40-42°. |
| 74 | CH₃ | CH₃ | n-C₆H₁₃ | O | M.P. 33-35°. |
| 75 | CH₃ | CH₃ | CH(CH₃)₂ | O | M.P. 94.° |
| 76 | n-C₃H₇ | CH₃ | CH₃ | O | $n_D^{27}$ 1.5196. |
| 77 | n-C₃H₇ | CH₃ | C₂H₅ | O | $n_D^{26}$ 1.5270. |
| 78 | n-C₃H₇ | CH₃ | CH(CH₃)₂ | O | $n_D^{27}$ 1.5181. |
| 79 | n-C₃H₇ | CH₃ | n-C₄H₉ | O | $n_D^{24}$ 1.4992. |

As stated above the invention is also to be taken as including within its scope salts of the invention compounds and complexes of the invention compounds, with metal ions, for example, copper, zinc or nickel ions.

The complexes are believed to be of the type where two or three molecules of the invention compound is complexed to a metal ion M of valency n through the oxygen atoms, thus:

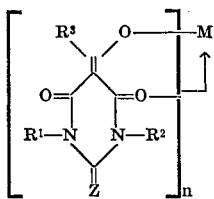

Some examples of complexes are given in Table 2 below which gives the nature of R¹, R², R³, Z and M

TABLE 2

| Compound number | R¹ | R² | R³ | Z | M |
|---|---|---|---|---|---|
| 80 | n-C₃H₇ | CH₃ | CH(CH₃)₂ | S | Zinc. |
| 81 | n-C₃H₇ | CH₃ | CH(CH₃)₂ | S | Copper. |
| 82 | n-C₃H₇ | CH₃ | CH(CH₃)₂ | S | Nickel. |
| 83 | n-C₃H₇ | CH₃ | C₂H₅ | O | Copper. |

The enol ethers and enol esters of the invention compounds can be considered as having the general structural formula:

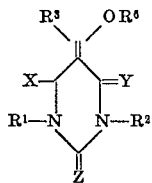

or an isomeric or tautomeric form thereof, wherein R⁶ represents an unsubstituted or substituted hydrocarbyl group or an unsubstituted or substituted acyl group and X, Y, Z, R¹, R² and R³ have any of the meanings hereinbefore defined. In a further aspect the invention also includes derivatives of the invention compounds, derived from the carbonyl group of the 5-acyl substituent of the pyrimidine ring including for example, oximes, semicarbazones, thiosemicarbazones, hydrazones, acyclic and cyclic ketals, thioketals and mercaptals.

The invention also provides a process for the preparation of compounds of the general formula:

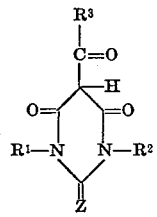

wherein a compound of formula:

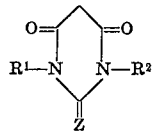

is reacted with a carboxylic acid of the formula:

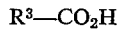

$$R^3—CO_2H$$

in the presence of a condensing agent. A suitable condensing agent for the above process is phosphorus oxychloride. The condensing agent can be used in excess as a diluent as well as a reagent, but other diluents can be used if desired.

The reaction may be accelerated by the use of higher temperatures, and the preferably carried out at the reflux temperature of the reaction mixture.

The invention compounds may be used to combat pests when applied directly but are more usefully employed in the form of a composition comprising, in addition to the invention compound, a diluent or carrier.

In a further aspect, therefore, the invention provides pesticidal compositions comprising as an active ingredient an invention compound as defined in any of the preceding paragraphs.

The compounds of this invention, and compositions comprising them, are very toxic towards a variety of insect and other invertibrate pests including the following:

*Tetranychus telarius* (red spider mites)
*Plutella maculipennis* (diamond back moth)
*Aphis fabae* (black aphids)
*Pieris brassicae* (cabbage white caterpiller)
*Blattella germanica* (cockroaches)
*Megoura viciae* (green aphids)
*Phaedon cochleariae* (mustard beetle)
*Musca domestica* (houseflies)
*Aedes aegypti* (mosquitos)
*Agriolimax reticulatus* (greyfield slug).

The compounds of the invention, and compositions comprising them, possess activity against a wide variety of plant foliar and post-harvest fungal and bacterial diseases including, for example, the following specific diseases:

*Puccinia recondita* (rust) on wheat
*Phytophthora infestans* (late blight) on tomatoes
*Botrytis cinerea* (chocolate spot) on broad beans
*Podosphaera leucotricha* (powder mildew) on applce
*Uncinula necator* (powdery mildew) on vine
*Piricularia oryzae* (blast) on rice
*Plasmopara viticola* (downy mildew) on vine
*Venturia inaequalis* (scab) on apple
*Botrytis tulipae* (fire) on bulbs
*Nigrospora sphaerica* (squirter) on bananas
*Phomopsis citri* (scab) on citrus
*Alternaria citri* (end rot) on citrus
*Penicillium italicum* (blue mould) on citrus
*Penicillium digitatum* (green mould) on citrus
*Gloeosporium musarum* (black end) on bananas

*Fusarium caeruleum* (dry rot) on potatoes
*Ceratocystis paradoxa* (gangrene) on potatoes
*Phoma exigua* (rot) on pineapple
*Phytophthora parasitica* (grey mould) on citrus
*Xanthomonas oryzae* (bacterial leaf blight) on rice
*Xanthomonas malvacearum* (blackarm) on cotton
*Erwinia amylovora* (fire blight) on pears and apples
*Erwinia carotovora* (bacterial soft rot) of vegetables
*Pseudomonas phaseolicola* (halo blight) on beans
*Pseudomonas syringae* (dieback) of stone fruit
*Pseudomonas mors-prunorum* (bacterial canker) of stone fruit
*Corynebacterium michiganense* (bacterial canker)
*Streptomyces scabies* (scab) on potatoes
*Agrobacterium tumefaciens* (crown gall).

Certain of the invention compounds also display herbicidal activity and are preferably used at higher rates of application for this purpose. Certain of the compounds are also algicidal.

In use, the invention compounds, or compositions containing them, may be used to combat pests in a variety of ways. Thus the pests themselves, or the locus of the pests, or the pest habitat may be treated to control the pests. In a further feature therefore the invention provides a method of combating pests wherein the pests, the locus of the pests, or the habitat of the pests is treated with a compound or a composition as described herein.

The invention also provides a method of treating plants to render them less susceptible to damage by pests, which may already be occurring (i.e. treatment to eradicate an infestation or infection) or which are expected to occur (i.e. treatment to protect the plant from an infestation or infection).

In a yet further feature, therefore, the invention provides a method of treating plants to render them less susceptible to damage by pests, which comprises treating the plants, or the seeds, corms, bulbs, tubers, rhizomes or other propagative parts of the plants, with a compound or composition as described herein.

If desired the medium in which the plants are growing may be similarly treated with an invention compound or a composition containing an invention compound.

In another feature, therefore, the invention provides a method of treating a medium in which plants are growing or to be grown which comprises applying to the medium a compound or composition as described herein.

The compounds of the invention or compositions comprising them may also be used to kill undesired plants, for example weeds.

The invention therefore provides a method of combating undesired plants which comprises treating the plants or the locus of the plants with a sufficient amount of an invention compound as composition as described herein to kill the plants.

The best herbicidal activity is obtained by post-emergent treatment. The compounds are more active herbicidally against broad-leaved dicotyledonous plants.

The compounds and compositions of the invention may be used for agricultural or horticultural purposes and the compound or type of composition used in any instance will depend upon the particular purpose for which it is to be used.

Compositions comprising the invention compounds may be in the form of dusting powders or granules wherein the active ingredient is mixed with a solid diluent or carrier. Suitable solid diluents or carriers may be, for example, kaolinite (china clay), montmorillonite, attapulgite, talc, pumice, silica, calcium carbonate, gypsum, powdered magnesia, fuller's earth, Hewitt's earth and diatomaceous earth. Compositions for dressing seed, for example, may comprise an agent assisting the adhesion of the composition to the seed, for example, a mineral oil.

The composition may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredient in the presence of one more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example, cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecylbenzenesulphonate, sodium, calcium or ammonium lignosulphonate, butylnaphthalene sulphonate, and a mixture of the sodium salts of diisopropyl- and triisopropyl-naphthalene sulphonic acids.

Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, the lecithins, and block copolymers of ethylene oxide and propylene oxide.

Suitable suspending agents are, for example, bentonite, pyrogenic silica, and hydrophilic colloids, for example polyvinylpyrrolidone and sodium carboxymethyl - cellulose, and the vegetable gums, for example gum acacia and gum tragacanth.

The aqueous solutions dispersions or emulsions may be prepared by dissolving the entire ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methyl-naphthalene, xylenes and trichloroethylene.

The compounds of the invention may also be formulated into compositions comprising capsules or microcapsules containing either the active ingredient itself, or a composition containing the active ingredient, and prepared by any of the known encapsulation or microencapsulation techniques.

The compositions to be used as sprays may also be in the form of aerosols wherein the formulation is held in a container under pressure in the presence of a propellant such as fluorotrichloromethane or dichlordifluoromethane.

By the inclusion of suitable additives, for example, for improving the distribution, adhesive powder and resistance to rain on treated surfaces, the different compositions can be better adapted for the various uses for which they are intended.

The compounds of this invention may also be conveniently formulated by admixing them with fertilizers. A preferred composition of this type comprises granules of fertilizer material incorporating, for example coated with, a compound of the invention. The fertilizer material may, for example, comprise nitrogen or phosphate-containing substances.

In yet a further aspect of the invention, therefore, we provide a fertilizer comprising a compound of the invention as hereinbefore defined.

The compositions which are to be used in the form of aqueous dispersions or emulsions are generally supplied in the form of a concentrate containing a high proportion of the active ingredient or ingredients, the said concentrate to be diluted with water before use.

These concentrates are often required to withstand storage for prolonged periods and after such storage, to be capable of dilutiont with water in order to form aqueous preparations which remain homogeneous for a sufficient time to enable them to be applied by conventional spray equipment. The concentrates may conveniently contain from 10–85% by weight of the active ingredient or ingredients and generally from 25–60% by weight of the active ingredient or ingredients. When diluted to form aqueous preparations, such preparations may contain varying amounts of the active ingredient or ingredients depending upon the purpose for which they are to be used, but an aqueous preparation containing between 0.001% and 1.0% by weight of active ingredient or ingredients may be used.

It is to be understood that the pesticidal compositions of this invention may comprise, in addition to a compound of the invention, one or more other compounds having biological activity.

The invention is illustrated, but not limited, by the following examples.

EXAMPLE 1

This example illustrates the preparation of 5-acetyl-1-ethyl-3-methyl-2-thiobarbituric acid (compound No. 6, Table I), having the structure:

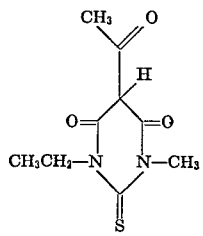

To a suspension of 1-ethyl-3-methyl-2-thiobarbituric acid (18.6 g.) in glacial acetic acid (104 cc.) was added phosphorus oxychloride (40 cc.) and the mixture was heated at the reflux temperature, with stirring, for 40 minutes, after which the mixture was cooled and poured into ice-water (400 cc.). After stirring a few minutes the red oil which separated out, solidified and was collected by filtration, washed with water and rercrystallised from petroleum-ether (boiling range 40–60° C.) to yield 5-acetyl-1-ethyl-3-methyl 2-thiobarbituric acid, as yellow needles, having a melting point of 72° C.

EXAMPLE 2

By a procedure similar to that illustrated in Example 1 above, but using the appropriate reactants, the preparation of all the other compounds listed in Table 1 was effected.

EXAMPLE 3

This example illustrates an atomisable fluid comprising a mixture consisting of 25% by weight of compound No. 1 of Table I and 75% by weight of xylene.

EXAMPLE 4

This example illustrates a dusting powder which may be applied directly to plants or other surfaces and comprises 1% by weight of compound No. 2 of Table I and 99% by weight of talc.

EXAMPLE 5

25 parts by weight of the product described in example 1, 65 parts by weight of xylene, and 10 parts of an alkyl aryl polyether alcohol ("Triton" X-100; "Triton" is a trademark) were mixed in a suitable mixer. There was thus obtained an emulsion concentrate which can be mixed with water to produce an emulsion suitable for use in agricultural applications.

EXAMPLE 6

5 parts by weight of the product described in example 1 were thoroughly mixed in a suitable mixer with 95 parts by weight of talc. There was thus obtained a dusting powder.

EXAMPLE 7

10 Parts by weight of the product described in Example 1, 10 parts of an ethylene oxide-octylphenol condensate ("Lissapol" NX; "Lissapol" is a trademark) and 80 parts by weight of diacetone alcohol were thoroughly mixed. There was thus obtained a concentrate which, on mixing with water, gave an aqueous dispersion suitable for application as a spray in the control of pests.

EXAMPLE 8

This example illustrates a concentrated liquid formulation in the form of an emulsion. The ingredients listed below were mixed together in the stated proportions and the whole stirred until the constituents were dispersed.

| | Percent wt. |
|---|---|
| Compound No. 36 (Table I) | 20 |
| "Lubrol" L ("Lubrol" is a trademark) | 17 |
| Calcium dodecylbenzenesulphonate | 3 |
| Ethylene dichloride | 45 |
| "Aromasol" H ("Aromasol" is a trademark) | 15 |
| | 100 |

EXAMPLE 9

The ingredients listed below were ground together in the proportions stated to produce a powdered mixture readily dispersible in liquids.

| | Percent wt. |
|---|---|
| Compound No. 24 (Table I) | 50 |
| Dispersol T ("Dispersol" is a trademark) | 5 |
| China clay | 45 |
| | 100 |

EXAMPLE 10

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

| | Percent wt. |
|---|---|
| Compound No. 29 (Table I) | 50 |
| Dispersol T | 12.5 |
| Calcium lignosulphonate | 5 |
| Sodium dodecylbenzenesulphonate | 12.5 |
| Sodium acetate | 20 |
| | 100 |

EXAMPLE 11

A composition suitable for use as a seed dressing was prepared by mixing all three of the ingredients set out below in the proportions stated.

| | Percent wt. |
|---|---|
| Compound No. 26 (Table I) | 80 |
| Mineral oil | 2 |
| China clay | 18 |
| | 100 |

EXAMPLE 12

A granular composition was prepared by dissolving the active ingredient in a solvent, spraying the solution obtained onto the granules of pumice and allowing the solvent to evaporate.

| | Percent wt. |
|---|---|
| Compound No. 7 (Table I) | 5 |
| Pumice granules | 95 |
| | 100 |

EXAMPLE 13

An aqueous dispersion formulation was prepared by mixing and grinding the ingredients recited below in the proportions stated.

| | Percent wt. |
|---|---|
| Compound No. 8 (Table I) | 40 |
| Calcium lignosulphonate | 10 |
| Water | 50 |
| | 100 |

The following constitutes an explanation of the compositions or substances represented by the various trademarks and trade names referred to in the foregoing examples.

"Lubrol" L is a condensate of 1 mole of nonyl phenol with 13 molar proportions of ethylene oxide.

"Aromasol" H is a solvent mixture of alkylbenzenes.

"Dispersol" T is a mixture of sodium sulphate and a condensate of formaldehyde with the sodium salt of naphthalene sulphonic acid.

"Lissapol" NX is a condensate of 1 mole of nonyl phenol with 8 moles of ethylene oxide.

"Triton" X-100 is an alkyl aryl polyether alcohol.

EXAMPLE 14

The activity of a number of the compounds was tested against a variety of insect and other invertebrate pests. The compounds were used in the form of a liquid preparation containing 0.1% by weight of the compound except in the tests with *Aedes aegypti* where the preparations contained 0.01% by weight of the compound. The preparations were made by dissolving each of the compounds in a mixture of solvents consisting of 4 parts by volume of acetone and 1 part by volume of diacetone alcohol. The solutions were then diluted with water containing 0.01% by weight of a wetting agent sold under the trade name "Lissapol" NX until the liquid preparations contained the required concentration of the compound. "Lissapol" is a registered trademark, the test procedure adopted with regard to each pest was basically the same and comprised supporting a number of the pests on a medium which was usually a host plant or a foodstuff on which the pest feed, and treating either or both the pests and the medium with the preparations.

The mortality of the pests was then assessed at periods usually varying from one to three days after the treatment.

The results of the tests are given below in Table 3. In this table the first column indicates the name of the pest species. Each of the subsequent columns indicates the host plant or medium on which it was supported, the number of days which were allowed to elapse after the treatment before assessing the mortality of the pests, and the results obtained for each of the compounds, numbered as in Table 1 and 2 above. The assessment is expressed in integers which range from 0-3.

0 represents less than 30% kill
1 represents 30–49% kill
2 represents 50–90% kill
3 represents over 90% kill
A indicates that an antifeedant effect was observed.
C indicates that a chemisterilant effect was observed.

TABLE 3

| Pest species | Support medium | Number of days | 1 | 2 | 3 | 4 | 5 | 6 | 7 | 10 | 11 | 12 | 13 | 14 | 15 | 16 | 17 | 18 | 19 |
|---|---|---|---|---|---|---|---|---|---|---|---|---|---|---|---|---|---|---|---|
| *Tetranychus telarius* (red spider mites, adults) | French bean | 3 | 3 / — | 3 / C | 3 | 3 | 3 | 3 | 3 | — | 3 | 3 / C | 3 | 3 | 3 | 3 | 3 / C | 3 | 3 |
| *Tetranychus telarius* (red spider mites, eggs) | do | 3 | 3 | — | — | 2 | — | — | 3 | — | 3 | 3 | 3 | 3 | 3 | 3 | — |
| *Aphis fabae* (green aphids) | Broad bean | 2 | 3 | — | 2 | 3 | 3 | 3 | 1 | 3 | 3 | — | — | 2 | 3 | 2 | 3 | 3 |
| *Megoura viceae* (black asphids) | do | 2 | 3 | — | 1 | 3 | 3 | 3 | — | 3 | 3 | — | — | 1 | — | — | 3 | 2 |
| *Aedes aegypti* (mosquito adults) | Plywood | 1 | — | — | — | — | — | — | — | — | — | 3 | 2 | 3 | 3 | — | — | 1 |
| *Aedes aegypti* (mosquito larvae) | Water | 1 | 3 | 3 | — | — | — | — | — | 1 | — | — | — | — | — | — | — | — |
| *Musca domestica* (houseflies—contact test*) | Milk/sugar | 2 | — | 3 | 3 | 3 | 2 | — | — | — | — | 3 | 2 | 3 | 1 | 3 | — | 2 |
| *Musca domestica* (houseflies—residual test*) | Plywood | 2 | — | — | — | — | — | — | — | — | — | — | — | 2 | — | — | — | — |
| *Pieris brassicae* (cabbage white caterpillars) | Cabbage | 2 | — | — | 2 | 2 | — | — | — | — | — | — | — | 3 | 3 | 2 | — | — |
| *Plutella maculipennis* (diamond back moth, larvae) | Mustard/paper | 2 | 3 / A | — | 2 / A | — | 2 / A | — / A | A | 1 / — | A / A | — / A | 2 / A | 1 / A | A / A | — / A | 1 / — | — / A |
| *Phaedon cochleariae* (mustard beetles) | do | 2 | — / A | 2 / A | 2 / A | 3 / A | 3 / A | 3 / A | — | 2 / A | 2 / A | 3 / A | 3 / A | 3 / A | 2 / A | 3 / A | 3 / A |
| *Blattella germanica* (cockroaches) | | 1 | A | A | A | A | A | A | — | — | A | A | A | A | A | A | A | A |
| *Meloidogyne incognita* (nematodes) | Water | 1 | 1 | — | — | 3 | — | — | — | — | — | — | — | — | — | — | — | — |

| Pest species | Support medium | Number of days | 20 | 21 | 22 | 23 | 24 | 25 | 26 | 27 | 29 | 30 | 31 | 32 | 33 | 34 | 35 | 36 |
|---|---|---|---|---|---|---|---|---|---|---|---|---|---|---|---|---|---|---|
| *Tetranychus telarius* (red spider mites, adults) | French bean | 3 | 3 / — | 3 / C | 2 | — | 3 | 3 | 3 | 3 | 3 / C | 3 | 3 | 3 | 3 | 3 | 3 | 3 |
| *Tetranychus telarius* (red spider mites, eggs) | do | 3 | 3 | 3 | — | — | 3 | 3 | — | 3 | — | 3 | 2 | — | — | — | — | 3 |
| *Aphis fabae* (green aphids) | Broadbean | 2 | 3 | 3 | — | — | — | — | 1 | — | — | — | — | — | — | 3 | 3 | 3 |
| *Megoura viceae* (black aphids) | do | 2 | 1 | — | — | — | — | — | — | — | — | — | — | — | — | — | — | — |
| *Aedes aegypti* (mosquito adults) | Plywood | 1 | — | 2 | — | — | — | — | — | — | — | — | — | — | — | 3 | 2 | — |
| *Aedes aegypti* (mosquito larvae) | Water | 1 | — | — | — | — | — | — | — | — | — | — | — | — | — | — | — | — |
| *Musca domestica* (houseflies—contact test *) | Milk/sugar | 2 | 2 | 3 | 2 | 1 | 1 | — | 2 | 1 | — | — | — | — | 2 | 2 | 2 | 2 |
| *Musca domestica* (houseflies—residual test *) | Plywood | 2 | — | 2 | — | — | — | — | — | — | — | — | — | — | 1 | — | — | — |
| *Pieris brassicae* (cabbage white caterpillars) | Cabbage | 2 | 3 / A | — | — / A | — | — / A | — | — / A | A | — | — | — | — | — | — | — | — |
| *Plutella maculipennis* (diamond back moth, larvae) | Mustard/paper | 2 | — | — | — | — | — | — | A | A | A | A | — | 2 | 1 | — | A / A | A |
| *Phaedon cochleariae* (mustard beetles( | do | 2 | 3 / A | 3 / A | 2 / A | — | 2 / A | — | 3 / A | 2 / A | 2 / A | 3 / A | 2 / A | — | 3 / A | 2 / A | 3 |
| *Blattella germanica* (cockroaches) | | 1 | — | — | — | — | — | — | — | — | — | — | — | — | — | — | — | — |
| *Meloidogyne incognita* (nematodes) | Water | 1 | — | 3 | — | — | — | — | — | — | — | 3 | — | — | — | — | — | — |

TABLE 3—Continued

| Pest species | Support medium | Number of days | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|
| *Tetranychus telarius* (red spider mites, adults) | French bean | 3 | 3 | 3 | 2 | 3 | 3 | 4 | 3 | 3 | 3 | 3 | 3 | 3 | 3 | 3 | 3 | 3 |
|  |  |  |  |  |  |  |  |  |  |  | C |  |  |  |  |  |  |  |
| *Tetranychus telarius* (red spider mites, eggs) | do | 3 | 3 |  |  | 2 | 3 |  | 2 | 3 | 2 |  | 3 | 3 | 2 |  |  | 2 |
| *Aphis fabae* (green aphids) | Broad bean | 2 | 3 | 3 |  | 3 | 3 |  |  |  | 2 |  | 2 |  |  | 3 | 2 | 1 | 3 |
| *Megoura viceae* (black aphids) | do | 2 |  | 2 |  |  |  |  |  |  |  |  |  |  | 3 | 1 |  | 3 |
| *Aedes aegypti* (mosquito adults) | Plywood | 1 |  |  |  |  | 2 |  | 2 |  |  |  |  |  | 3 |  | 2 | 1 |
| *Aedesi aegypti* (mosquito larvae) | Water | 1 |  |  |  |  |  |  |  |  |  |  |  |  | 3 |  |  |  |
| *Musca domestica* (houseflies—contact test*) | Milk/sugar | 2 | 2 | 1 |  | 2 | 3 |  | 2 | 1 | 2 | 2 | 1 | 2 | 1 | 3 | 2 | 2 |
| *Musca domestica* (houseflies—residual test*) | Plywood | 2 |  |  |  |  |  |  |  |  |  | 1 |  | 1 |  |  |  | 1 |
| *Pieris brassicae* (cabbage white caterpillars) | Cabbage | 2 |  |  |  |  | 2 |  | 3 | 2 |  |  |  | 2 | 3 | 3 |  |  |
|  |  |  |  | A |  | A |  | A |  | A | A |  |  |  | A | A | A |  |
| *Plutella maculipennis* (diamond back moth larvae) | Mustard/paper | 2 |  |  |  | 1 |  |  |  |  |  |  |  | A | A | A | A |  |
|  |  |  | A |  |  | A |  |  |  |  |  |  |  |  |  |  |  |  |
| *Phaedon cochleariae* (mustard beetles) | do | 2 | 2 | 3 |  | 2 |  | 2 | 2 | 1 | 3 | 3 | 3 | 3 | 1 | 3 | 3 | 3 |
|  |  |  |  | A |  | A | A | A | A | A | A | A | A | A | A | A | A | A |
| *Blattella germanica* (cockroaches) |  | 1 |  |  |  | 3 |  |  |  |  |  |  |  |  |  |  |  |  |
| *Meloidogyne incognita* (nematodes) | Water | 1 |  |  | 3 |  |  |  |  |  |  |  |  |  |  |  |  |  |

| Pest species | Support medium | Number of days | 51 | 52 | 53 | 54 | 55 | 56 | 57 | 58 | 59 | 60 | 61 | 62 | 64 | 65 | 66 | 67 |
|---|---|---|---|---|---|---|---|---|---|---|---|---|---|---|---|---|---|---|
| *Tetranychus telarius* (red spider mites, adults) | French bean | 3 | 3 | 3 | 3 | 3 | 3 | 3 | 3 | 3 | 3 | 3 | 2 |  | 3 | 3 | 3 | 2 |
| *Tetranychus telarius* (red spider mites, eggs) | do | 3 | 3 | 2 | 3 | 3 | 3 | 3 | 3 | 3 |  | 3 |  | 1 | 3 | 3 | 3 |  |
| *Aphis fabae* (green aphids) | Broad bean | 2 | 3 | 2 | 3 |  |  |  |  |  |  |  |  |  |  |  |  |  |
| *Megoura viceae* (black aphids) | do | 2 | 3 | 2 | 2 |  |  |  |  |  |  |  |  |  |  |  |  |  |
| *Aedes aegypti* (mosquito adults) | Plywood | 1 | 1 | 2 | 3 | 2 |  |  |  |  |  |  | 2 |  |  |  |  |  |
| *Aedes aegypti* (mosquito larvae) | Water | 1 |  | 1 | 3 |  |  |  |  |  |  |  |  |  |  |  |  | 3 |
| *Musca domestica* (houseflies—contact test*) | Milk/sugar | 2 | 2 |  | 3 |  | 1 |  |  |  |  |  |  |  |  |  |  |  |
| *Musca domestica* (houseflies—residual test*) | Plywood | 2 | 1 |  |  |  |  |  | 2 | 2 |  |  |  |  |  |  |  |  |
| *Pieris brassicae* (cabbage white caterpillars) | Cabbage | 2 |  | 3 | 3 |  |  |  |  |  |  | 3 |  |  |  |  |  |  |
|  |  |  |  | A | A | A |  | A | A | A | A |  | A |  |  |  |  |  |
| *Plutella maculipennis* (diamond back moth, larvae) | Mustard/paper | 2 |  |  |  | A |  |  |  |  |  |  |  |  |  |  |  |  |
| *Phaedon cochleariae* (mustard beetles) | do | 2 | 3 | 3 | 3 | 3 | 3 |  |  |  |  |  |  |  | 3 | 3 | 2 |  |
|  |  |  | A | A | A | A | A |  | A | A | A | A |  |  |  |  |  |  |
| *Blattella germanica* (cockroaches) |  | 1 |  |  |  |  |  |  |  |  |  |  |  |  | 3 | 3 |  | 2 |
| *Meloidogyne incognita* (nematodes) | Water | 1 |  |  |  |  |  |  |  |  |  |  |  |  |  |  |  |  |

| Pest species | Support medium | Number of days | 68 | 69 | 70 | 71 | 72 | 73 | 74 | 75 | 76 | 77 | 78 | 79 | 80 | 81 | 82 | 83 |
|---|---|---|---|---|---|---|---|---|---|---|---|---|---|---|---|---|---|---|
|  |  |  |  |  |  |  | Compound No. (Table 1) |  |  |  |  |  |  |  | Compound No (Table 2) |  |  |  |
| *Tetranychus telarius* (red spider mites, adults) | French bean | 3 | 1 | 3 | 3 | 3 | 3 | 3 | 3 | 3 | 3 | 3 | 3 | 3 | 1 |  | 1 |  |
|  |  |  |  |  |  |  | C |  |  |  |  |  |  |  |  | C |  |  |
| *Tetranychus telarius* (red spider mites, eggs) | do | 3 |  |  |  |  |  | 3 | 3 | 3 |  |  |  | 3 |  | 1 | 1 |  |
| *Aphis fabae* (green aphids) | Broad bean | 2 |  |  |  |  |  | 2 |  |  | 3 | 3 | 3 |  |  |  |  |  |
| *Megoura viceae* (black aphids) | do | 2 |  |  |  |  |  |  |  |  | 3 | 3 | 3 |  |  |  |  |  |
| *Aedes aegypti* (mosquito adults) | Plywood | 1 |  |  |  |  |  | 1 |  |  |  |  |  |  |  |  |  |  |
| *Aedes aegypti* (mosquito larvae) | Water | 1 | 3 | 3 |  |  |  |  |  |  |  |  |  |  |  | 3 | 1 | 3 |
| *Musca domestica* (houseflies—contact test*) | Milk/sugar | 2 |  |  | 3 | 1 | 2 |  |  |  |  | 2 |  | 1 |  |  |  |  |
| *Musca domestica* (houseflies—residual test*) | Plywood | 2 |  |  |  |  |  |  |  |  |  |  |  |  |  |  |  |  |
| *Pieris brassicae* (cabbage white caterpillars) | Cabbage | 2 |  |  |  |  |  |  |  |  |  |  |  |  | A |  | A |  |
| *Plutella maculipennis* | Mustard/paper | 2 |  | 2 | 1 |  |  |  |  | 3 |  |  |  |  |  |  |  |  |
|  |  |  |  |  |  |  |  |  | A |  | A |  |  |  |  |  | A |  |
| *Phaedon cochleariae* (mustard beetles) | do | 2 |  | 2 |  |  | 2 | 2 |  |  |  |  |  |  |  | 1 |  |  |
|  |  |  |  |  |  |  | A | A |  |  |  |  |  |  |  |  | A |  |
| *Blattella germanica* (cockroaches) |  | 1 | 1 |  | 2 | 3 |  |  |  | 3 | 2 |  |  |  |  |  |  | 2 |
| *Meloidogyne incognita* (nematodes) | Water | 1 |  |  | 3 | 3 |  |  |  |  |  |  |  |  |  |  |  |  |

EXAMPLE 15

Compounds of the invention were tested for molluscidal activity and details of the tests conducted are as follows.

A weighed sample of the compound under test was dissolved in 0.5 cc. of an ethanol and acetone mixture (50:50 v./v.). The solution was diluted with 0.5 cc. water and water and poured onto a calf feeding pellet in a glass petri dish and the pellet was air dried for 24 hours. The weight of compound used was chosen so that the dried pellet contained 4% by weight of the active ingredient. Two replicates each consisting of a plastic petri dish containing a pellet, 2 slugs, and a moistened filter paper to maintain a high relative humidity were used in each test. The dishes were left in the cold room (10° C.). After 6 days the kill was assessed.

The slugs used were *Agriolimax reticulatus* (Mull), and they had been starved for 24 hours before the commencement of the tests. The results of the test are set out in Table 3A below. The results are graded from 0 to 3 as in Example 14 above.

TABLE 3A

| Compound No. (Table I): | Control grading |
|---|---|
| 3 | 2 |
| 9 | 2 |
| 10 | 2 |
| 22 | 2 |
| 23 | 2 |
| 31 | 2 |
| 42 | 2 |
| 54 | 2 |
| 61 | 2 |

EXAMPLE 16

The compounds of this invention were tested against a variety of foliar fungal diseases of plants. The technique employed is to spray the foliage of the undiseased plants with a solution of the test compound and also to drench the soil in which the plants are growing with another solution of the same test compound. All solutions for spraying and drenching contained 0.01% of the test compound.

The plants were then infected with the diseases it was desired to control and after a period of days, depending upon the particular disease, the extent of the disease was visually assessed. The results are given in Table 4A below, wherein the extent of the disease is given in the form of a grading as follows.

| Grading: | Percentage amount of disease |
|---|---|
| 0 | 61–100 |
| 1 | 26–60 |
| 2 | 6–25 |
| 3 | 0–5 |

P indicates that phytotoxic damage was observed in the host plant.

In Table 4 the disease is given in the first column, and in the second column is given the time which elapsed between infecting the plants and assessing the amount of disease.

TABLE 4

| Disease and plant | Time interval (days) | Disease code letter (Table 4A) |
|---|---|---|
| Phytophthora infestans (tomato) | 3 | A |
| Plasmopara viticola (vine) | 7 | B |
| Uncinula necator (vine) | 10 | C |
| Piricularia orysae (rice) | 7 | D |
| Podosphaera leucotricha (apple) | 10 | E |
| Venturia inaequalis (apple) | 21 | F |
| Botrytis cinerea (broad bean) | 3 | G |
| Puccinia recondita (wheat) | 10 | H |

TABLE 4A

| Compound number, Tables 1 and 2 | A | B | C | D | E | F | G | H |
|---|---|---|---|---|---|---|---|---|
| 1 | 0 | P | P | 0 | 2 | 0 | 0 | 0 |
| 2 | P | P | P | P | 3 |  | P | 1 |
| 4 | 2 | P | 0 |  | 2 | 3 |  | 0 |
| 5 | P | P | P | P | 3 |  | 0 | 1 |
| 6 | 0 | P | P | P | 3 | P | 3 | 0 |
| 7 | 0 | P | P | P | P | 3 | P | 0 |
| 8 | 0 | 2 | P | 0 | 0 |  | 2 | 3 |
| 9 | 1 | 0 | 0 | 1 | 3 |  |  | 2 |
| 10 | 2 | 1 | 0 | 2 |  |  | 0 | 0 |
| 11 | 2 | 2 | 2 | 1 | 0 |  | 3 | 0 |
| 12 | P | P | P | P | 3 |  |  | 2 |
| 13 | 1 | P | P | 2 | 3 |  |  | 2 |
| 14 | 2 | 3 | P | 0 | 3 | 2 | 2 | 0 |
| 15 | 2 | P | P | P | 3 |  | 2 | 2 |
| 16 | 0 | P | P | P | 3 |  |  | 1 |
| 17 | 2 | P | P | P | 3 |  | 3 | 0 |
| 18 | 1 | P | P | 0 | 0 |  |  | 0 |
| 19 | P | 3 | P | 1 | P | 3 | 3 | 0 |
| 20 | P | 3 | 0 | P | P |  |  | 0 |
| 21 | 0 | 1 | 0 | 0 | 0 |  |  | 0 |
| 22 | 1 | 2 | 0 | 0 | 3 | 0 |  | 0 |
| 23 | 2 | 2 | P | 2 | 2 |  |  | 0 |
| 24 | 2 | 2 | 2 | 0 | 3 |  |  | 0 |
| 25 | 3 | 3 | 3 | 0 | 3 |  |  | 0 |
| 27 | 3 | 3 | 1 | 0 | 3 | 3 | 3 | 0 |
| 28 | 3 | 3 | 1 | 2 | 2 | 3 | 2 | 2 |
| 29 | P | 3 | P | P | 3 | 3 | 0 | 0 |
| 30 | 0 | 0 | P | 2 | 0 |  | 0 | 0 |
| 31 | P | 1 | 0 | 3 | 2 |  | 0 | 0 |
| 32 | P | 3 | 0 | 0 | 3 | 0 | P | 0 |
| 33 | 3 | 3 | 2 | 3 | 3 |  | 2 | 1 |
| 34 | 3 | 3 | 0 | 2 | 1 |  | P | 1 |
| 35 | 3 | 0 | P | 2 | 3 |  | P | 0 |
| 36 | P | 1 | 0 | 2 | 3 |  | P | 0 |
| 37 | 0 | 3 | 0 | 3 | 3 | 3 | P | 0 |
| 39 | 0 | 0 | 3 | 0 |  |  | P | 0 |
| 40 | 1 | 0 | P | 3 |  |  | 3 | 0 |
| 41 | P | P | P | 2 | 3 |  | P | 0 |
| 42 | 0 | 0 | 0 | 3 | 0 |  | P | 0 |
| 43 | P | 0 | 0 | 0 | 3 |  | P | 0 |
| 44 | P | P | P | 2 | 0 |  | P | 0 |
| 45 | P | 3 | 3 | 2 | 0 |  | 3 | 0 |
| 46 | P | 0 | 0 | 0 | 3 |  | 3 | 0 |
| 47 | P | 0 | 0 | P | 3 |  | P | 2 |
| 48 | 2 | 3 | 3 | 2 | 3 |  | P | 0 |
| 49 | 0 | 2 | P | 2 | 2 |  | P | 0 |
| 50 | P | 2 | 0 | 2 | 3 |  | 0 | 1 |
| 54 | P | 3 | 2 | 0 | 2 |  | P | 0 |
| 55 | P | 2 | 0 | 0 | 2 |  | 2 | 1 |
| 56 | 3 |  |  |  |  |  | 3 |  |
| 71 | 1 | 2 | 0 | 0 | 0 |  | 2 | 1 |
| 72 | 0 | 3 | 2 | 0 | 0 |  | P | 0 |
| 73 | 0 | 3 | 0 | 2 | 0 |  | P | 0 |
| 74 | 1 | 0 | 3 | 3 | 0 |  | P | 0 |
| 75 | 0 | 0 | 3 | 0 | 0 |  | P | 0 |
| 80 | 0 | 1 | 0 | 0 |  |  | P | 2 |
| 81 | 0 | 3 | 0 | 0 | 3 | 0 | 3 | 0 |
| 82 | 0 | 3 | 3 | 2 |  |  | P | 3 |

Certain of the compounds were retested using spray applied compositions containing 25 parts per million of the active ingredient. The results, graded as in the previous table, are given in Table 5 below.

TABLE 5

| Compound number Tables 1 and 2 | Disease code letter | | |
|---|---|---|---|
|  | A | E | F |
| 5 | 2 |  |  |
| 19 | 3 | 1 | 3 |
| 27 | 2 | 3 | 2 |
| 28 | 2 | 3 | 3 |
| 33 | 3 | 0 |  |
| 34 | 3 |  |  |
| 81 | 1 | 3 | 0 |

EXAMPLE 17

Compounds of the invention were tested as potential algicides. A mixed algal culture was treated with a quantity of an aqueous suspension of the compound under test so that the culture contained 100 parts per million of the compound. The following compounds were found to completely control the algal growth at this concentration. Compounds Nos. 12, 13, 14, 15, 16, 18, 19, 20, 21, 22, 23, 33, 34 and 36.

EXAMPLE 18

The activity of the compound of the invention against a wide variety of plant bacterial diseases and fungal post-harvest saprophytic diseases was investigated by in vitro tests as follows. 5 mg. of the compound under test was dissolved or suspended in 10 cc. of acetone and 2 cc. of this solution or suspension was added to 18 cc. of nutrient agar (for the bacterial diseases) or 16 cc. of 2% malt agar (for the fungal diseases) to give a final concentration of 50 parts per million of the compound under test. 2 cc. of a streptomycin preparation containing 100 units/cc. was added to the malt agar to prevent bacterial contamination of the fungal tests.

The agar preparations were dried overnight in petri dishes and inoculated the following morning with the bacterial or fungal diseases using a multipoint inoculator. The antibacterial activity was assessed after 5 days and the antifungal activity after 6 days.

The results of the tests are set out below in Table 7 (antibacterial activity) and Table 8 (antifungal activity). The results are graded as in Example 16 above. The names of the disease organisms are indicated in Table 6.

TABLE 6

| Bacterial disease organism | Code Table 7 | Fungal disease organism | Code Table 8 |
|---|---|---|---|
| Agrobacterium tumifaciens. | B1 | Phoma exigua | F1 |
| Corynebacterium michiganense. | B2 | Ceratocystis paradoxa | F2 |
| Xanthomonas Malvacearum. | B3 | Alternaria citri | F3 |
| Erwinia carotovora | B4 | Diplodia natalensio | F4 |
| Xanthomonas oryzae | B5 | Penicillium italicum | F5 |
| Pseudomonas syringae | B6 | Gloeosporium musarum. | F6 |
| Streptomyces scabies | B7 | Penicillium digitatum | F7 |
| Pseudomonas mors-prunorum. | B8 | Fusarium caeruleum | F8 |
| Pseudomonas phaseolicola. | B9 | Botrytis tulipae | F9 |
| Erwinia amylovora | B10 | Phomopsis citri | F10 |
|  |  | Nigrospora sphaerica | F11 |

TABLE 7

| Compound number, Tables 1 and 2 | Disease code (Table 6) | | | | | | | | | |
|---|---|---|---|---|---|---|---|---|---|---|
|  | B1 | B2 | B3 | B4 | B5 | B6 | B7 | B8 | B9 | B10 |
| 2 | 1 | 2 | 0 | 0 | 2 | 1 | 2 | 0 | 0 | 2 |
| 3 | 1 | 2 | 0 | 0 | 1 | 0 | 1 | 0 | 0 | 1 |
| 4 | 2 | 2 | 0 | 0 | 1 | 1 | 1 | 0 | 0 | 1 |
| 5 | 2 | 2 | 1 | 0 | 2 | 2 | 2 | 0 | 0 | 2 |
| 7 | 2 | 2 | 0 | 0 | 2 | 0 | 1 | 0 | 0 | 2 |
| 10 | 2 | 3 | 0 | 0 | 3 | 2 | 2 | 0 | 0 | 2 |
| 11 | 0 | 2 | 0 | 0 | 2 | 2 | 2 | 0 | 0 | 2 |
| 12 | 2 | 3 | 0 | 0 | 3 | 2 | 2 | 0 | 0 | 2 |
| 13 | 2 | 3 | 0 | 0 | 3 | 2 | 2 | 0 | 0 | 2 |
| 14 | 2 | 3 | 0 | 0 | 3 | 2 | 2 | 0 | 0 | 2 |
| 15 | 1 | 2 | 1 | 0 | 2 | 2 | 2 | 0 | 0 | 2 |
| 16 | 2 | 3 | 0 | 0 | 2 | 2 | 2 | 0 | 0 | 2 |
| 17 | 1 | 2 | 0 | 0 | 3 | 2 | 2 | 0 | 0 | 2 |
| 18 | 2 | 2 | 0 | 0 | 3 | 2 | 2 | 0 | 0 | 2 |

TABLE 7—Continued

| Compound number, Tables 1 and 2 | B1 | B2 | B3 | B4 | B5 | B6 | B7 | B8 | B9 | B10 |
|---|---|---|---|---|---|---|---|---|---|---|
| 21 | 2 | 2 | 0 | 0 | 2 | 2 | 2 | 0 | 0 | 2 |
| 22 | 2 | 3 | 2 | 0 | 3 | 2 | 2 | 0 | 0 | 2 |
| 23 | 2 | 2 | 1 | 0 | 3 | 2 | 2 | 0 | 0 | 2 |
| 24 | 2 | 2 | 0 | 0 | 2 | 2 | 2 | 0 | 0 | 2 |
| 25 | 2 | 3 | 0 | 0 | 2 | 2 | 2 | 0 | 0 | 2 |
| 27 | 0 | 2 | 0 | 0 | 1 | 2 | 2 | 0 | 1 | 2 |
| 28 | 0 | 3 | 0 | 0 | 2 | 1 | 2 | 0 | 0 | 1 |
| 29 | 2 | 3 | 0 | 0 | 3 | 3 | 3 | 1 | 0 | 2 |
| 26 | 2 | 2 | 0 | 0 | 2 | 1 | 2 | 0 | 0 | 2 |
| 30 | 0 | 0 | 0 | 0 | 0 | 2 | 0 | 0 | 0 | 1 |
| 31 | 1 | 2 | 0 | 0 | 2 | 2 | 2 | 0 | 0 | 2 |
| 32 | 0 | 2 | 0 | 0 | 2 | 2 | 2 | 0 | 0 | 2 |
| 33 | 2 | 3 | 0 | 0 | 2 | 2 | 2 | 0 | 0 | 2 |
| 34 | 0 | 2 | 0 | 0 | 2 | 2 | 2 | 0 | 0 | 2 |
| 36 | 1 | 2 | 0 | 0 | 2 | 0 | 2 | 0 | 0 | 2 |
| 37 | 2 | 3 | 0 | 0 | 2 | 0 | 2 | 0 | 0 | 2 |
| 39 | 2 | 2 | 0 | 0 | 0 | 2 | 2 | 0 | 2 | 1 |
| 40 | 1 | 3 | 0 | 0 | 2 | 2 | 3 | 0 | 0 | 2 |
| 41 | 1 | 2 | 0 | 0 | 1 | 0 | 3 | 0 | 0 | 2 |
| 42 | 1 | 3 | 0 | 0 | 2 | 0 | 3 | 0 | 0 | 2 |
| 43 | 2 | 2 | 0 | 0 | 2 | 1 | 3 | 0 | 0 | 2 |
| 44 | 2 | 3 | 0 | 0 | 2 | 2 | 2 | 0 | 0 | 2 |
| 45 | 2 | 2 | 0 | 0 | 2 | 2 | 3 | 0 | 0 | 2 |
| 46 | 2 | 3 | 0 | 0 | 2 | 2 | 2 | 0 | 0 | 2 |
| 47 | 2 | 3 | 0 | 0 | 2 | 2 | 2 | 0 | 0 | 2 |
| 49 | 2 | 3 | 0 | 0 | 2 | 3 | 3 | 0 | 9 | 2 |
| 50 | 1 | 2 | 0 | 0 | 2 | 2 | 2 | 0 | 0 | 2 |
| 51 | 1 | 3 | 0 | 0 | 2 | 2 | 3 | 0 | 0 | 2 |
| 52 | 2 | 3 | 0 | 0 | 2 | 2 | 3 | 0 | 0 | 2 |
| 53 | 2 | 3 | 0 | 0 | 2 | 2 | 3 | 0 | 0 | 2 |
| 54 | 0 | 3 | 0 | 0 | 2 | 2 | 3 | 0 | 0 | 2 |
| 55 | 2 | 3 | 1 | 0 | 2 | 3 | 2 | 0 | 0 | 2 |
| 56 | 3 | 3 | 2 | 0 | 3 | 3 | 3 | 0 | 0 | 2 |
| 57 | 0 | 3 | 0 | 0 | 3 | 2 | 2 | 0 | 0 | 0 |
| 58 | 0 | 2 | 2 | 0 | 3 | 2 | 0 | 0 | 0 | 0 |
| 59 | 0 | 2 | 0 | 0 | 2 | 2 | 3 | 0 | 0 | 2 |
| 60 | 0 | 3 | 0 | 0 | 3 | 3 | 3 | 0 | 3 | 3 |
| 61 | 0 | 3 | 0 | 0 | 2 | 0 | 2 | 0 | 0 | 0 |
| 62 | 1 | 2 | 3 | 1 | 2 | 0 | 2 | 2 | 1 | 1 |
| 63 | 0 | 3 | 0 | 0 | 2 | 2 | 0 | 0 | 0 | 2 |
| 64 | 0 | 2 | 0 | 0 | 2 | 2 | 2 | 0 | 0 | 2 |
| 65 | 0 | 3 | 0 | 0 | 2 | 2 | 2 | 0 | 0 | 2 |
| 66 | 0 | 2 | 0 | 0 | 0 | 2 | 0 | 0 | 0 | 0 |
| 69 | 1 | 2 | 1 | 3 | 2 | 1 | 0 | 0 | 0 | 0 |
| 70 | 2 | 2 | 2 | 3 | 2 | 2 | 2 | 0 | 0 | 0 |
| 74 | 1 | 3 | 0 | 0 | 2 | 2 | 2 | 0 | 0 | 0 |
| 80 | 1 | 2 | 1 | 0 | 2 | 0 | 2 | 0 | 0 | 0 |

TABLE 8

| Compound number, Tables 1 and 2 | F1 | F2 | F3 | F4 | F5 | F6 | F7 | F8 | F9 | F10 | F11 |
|---|---|---|---|---|---|---|---|---|---|---|---|
| 2 | 0 | 0 | 3 | 3 | 0 | 2 | 2 | 0 | 0 | 3 | |
| 3 | 0 | 0 | 1 | 1 | 0 | 2 | 0 | 0 | 0 | 3 | |
| 4 | 0 | 0 | 0 | 0 | 0 | 0 | 0 | 0 | 0 | 3 | |
| 5 | 3 | 3 | 3 | 3 | 3 | 3 | 3 | 3 | 3 | 3 | |
| 6 | 1 | 1 | 2 | 3 | 0 | 2 | 3 | 3 | 2 | 3 | |
| 7 | 0 | 0 | 3 | 3 | 0 | 3 | 1 | 0 | 1 | 3 | |
| 10 | 0 | 3 | 3 | 3 | 0 | 3 | 3 | 0 | 3 | 3 | |
| 12 | 1 | 3 | 3 | 3 | 0 | 3 | 2 | 0 | 1 | 3 | |
| 13 | 0 | 2 | 3 | 3 | 0 | 3 | 1 | 0 | 1 | 3 | |
| 14 | 0 | 3 | 3 | 3 | 1 | 3 | 1 | 0 | 0 | 3 | |
| 15 | 1 | 1 | 3 | 3 | 1 | 3 | 3 | 1 | 3 | 3 | |
| 16 | 0 | 0 | 0 | 3 | 0 | 0 | 0 | 0 | 0 | 3 | |
| 17 | 0 | 0 | 3 | 3 | 1 | 3 | 1 | 0 | 3 | 3 | |
| 18 | 0 | 3 | 3 | 3 | 2 | 3 | 2 | 3 | 3 | 3 | |
| 21 | 0 | 0 | 0 | 0 | 1 | 2 | 2 | 0 | 0 | 3 | |

TABLE 8—Continued

| Compound number Tables 1 and 2 | F1 | F2 | F3 | F4 | F5 | F6 | F7 | F8 | F9 | F10 | F11 |
|---|---|---|---|---|---|---|---|---|---|---|---|
| 23 | 0 | 3 | 3 | 1 | 3 | 1 | 3 | 3 | 3 | 3 | |
| 24 | 0 | 0 | 2 | 3 | 1 | 2 | 0 | 2 | 0 | 3 | |
| 25 | 0 | 0 | 0 | 0 | 0 | 3 | 3 | 0 | 0 | | |
| 29 | 0 | 0 | 3 | 3 | 0 | 3 | 3 | 0 | 3 | 3 | |
| 32 | 0 | 0 | 0 | 0 | 0 | 0 | 3 | 0 | 0 | | |
| 33 | 0 | 3 | 3 | 1 | 3 | 3 | 0 | 3 | 3 | 3 | |
| 34 | 1 | 1 | 3 | 3 | 1 | 1 | 1 | 0 | 3 | 3 | |
| 36 | 0 | 0 | 0 | 3 | 1 | 2 | 1 | 0 | 2 | 3 | |
| 37 | 0 | 0 | 0 | 3 | 1 | 2 | 1 | 0 | 0 | 3 | |
| 39 | 0 | 0 | 0 | 3 | 1 | 0 | 0 | 0 | 2 | 1 | |
| 40 | 0 | 0 | 0 | 3 | 1 | 1 | 1 | 0 | 3 | 3 | |
| 41 | 0 | 0 | 0 | 3 | 0 | 2 | 0 | 0 | 2 | 1 | |
| 42 | 0 | 0 | 0 | 0 | 0 | 1 | 0 | 0 | 0 | | |
| 43 | 0 | 0 | 3 | 3 | 0 | 3 | 0 | 0 | 3 | 3 | |
| 44 | 0 | 0 | 3 | 3 | 1 | 3 | 1 | 0 | 3 | 3 | |
| 45 | 0 | 1 | 0 | 3 | 1 | 2 | 1 | 0 | 1 | 3 | |
| 46 | 0 | 0 | 3 | 3 | 1 | 2 | 0 | 0 | 1 | 1 | |
| 47 | 2 | 2 | 3 | 3 | 1 | 2 | 2 | 3 | 2 | 3 | |
| 49 | 0 | 0 | 3 | 3 | 0 | 3 | 3 | 0 | 0 | 3 | |
| 51 | 0 | 0 | 3 | 3 | 1 | 2 | 2 | 3 | 3 | 3 | |
| 52 | 1 | 1 | 3 | 3 | 3 | 3 | 3 | 1 | 1 | 3 | |
| 53 | 1 | 1 | 3 | 3 | 1 | 1 | 1 | 1 | 1 | 3 | |
| 54 | 0 | 0 | 0 | 0 | 0 | 0 | 0 | 0 | 2 | 0 | |
| 55 | 0 | 3 | 3 | 3 | 1 | 2 | 2 | 2 | 3 | 3 | |
| 57 | 0 | 3 | 1 | 0 | 0 | 0 | 0 | 1 | 1 | 1 | |
| 58 | 0 | 0 | 0 | 0 | 0 | 0 | 3 | 3 | 0 | | |
| 64 | 0 | 0 | 2 | 0 | 0 | 0 | 0 | 0 | 0 | | |
| 65 | 0 | 0 | 0 | 0 | 0 | 0 | 0 | 1 | 0 | | |
| 66 | | 0 | 1 | 0 | 0 | 0 | | | 0 | 3 | 3 |
| 67 | | 0 | 0 | 0 | 0 | 0 | | | 0 | 0 | 3 |
| 68 | | 0 | 1 | 0 | 0 | 0 | | | 0 | 1 | |
| 69 | | 0 | 0 | 0 | 0 | 0 | | | 0 | 3 | 3 |
| 70 | | 2 | 3 | 3 | 1 | 2 | | | 2 | 3 | 3 |
| 72 | 1 | 2 | 1 | 0 | 0 | 0 | 0 | 0 | 0 | 0 | |
| 73 | 0 | 3 | 3 | 3 | 0 | 3 | 3 | 3 | 2 | 3 | |
| 74 | 3 | 3 | 3 | 3 | 0 | 3 | 3 | 3 | 3 | 3 | |
| 77 | | 2 | 1 | 1 | 1 | 1 | | | 1 | 1 | 1 |
| 78 | | 1 | 1 | 1 | 1 | 1 | | | 1 | 1 | 1 |
| 79 | | 1 | 1 | 1 | 1 | 1 | | | 1 | 1 | 1 |
| 80 | 0 | 0 | 0 | 0 | 0 | 0 | 0 | 0 | 1 | 3 | |

EXAMPLE 19

This example illustrates the herbicidal properties of compounds according to the invention. The compounds were formulated for the test described below by ball milling them in water containing 2% of "Dispersol T." ("Dispersol T" is a registered trademark for a surface active agent comprising methylene dinaphthalene sulphonate.)

The suspensions so obtained were diluted with water and sprayed at a rate corresponding to 100 gallons per acre on to (a) pots of compost which had previously been sown with seeds of lettuce, tomato, wheat and maize (pre-emergence test) and (b) young plants of lettuce, tomato, wheat and maize growing in pots (post-emergence test). The rate of application in each test was equivalent to 10 pounds per acre of active ingredient. After 14 days the damage to the plants was assessed on a scale of 0 to 3 where 0 represents less than 25% damage and 3 represents 75 to 100% damage, the latter figure representing complete kill. The results are set out in Table 9 below.

TABLE 9

| Compound Number, Tables 1 and 2 | Pre-emergent test | | | | Post-emergent test | | | |
|---|---|---|---|---|---|---|---|---|
| | Lettuce | Tomato | Wheat | Maize | Lettuce | Tomato | Wheat | Maize |
| 1 | 0 | 0 | 0 | 0 | 3 | 3 | 0 | 0 |
| 2 | 0 | 0 | 0 | 0 | 3 | 0 | 0 | 0 |
| 3 | 0 | 0 | 0 | 1 | 3 | 3 | 0 | 0 |
| 4 | 0 | 0 | 0 | 0 | 3 | 0 | 0 | 0 |
| 5 | 0 | 0 | 0 | 0 | 3 | 0 | 0 | 0 |
| 7 | 0 | 0 | 0 | 0 | 3 | 2 | 0 | 1 |
| 8 | 0 | 0 | 0 | 0 | 3 | 0 | 0 | 0 |
| 9 | 0 | 0 | 0 | 0 | 0 | 1 | 0 | 0 |
| 10 | 0 | 0 | 1 | 0 | 3 | 2 | 0 | 0 |
| 12 | 0 | 0 | 0 | 0 | 3 | 3 | 0 | 0 |
| 13 | 0 | 0 | 0 | 0 | 3 | 3 | 0 | 1 |
| 14 | 0 | 0 | 0 | 0 | 3 | 3 | 1 | 1 |
| 15 | 0 | 0 | 0 | 0 | 3 | 3 | 1 | 1 |
| 16 | 0 | 0 | 0 | 0 | 3 | 3 | 0 | 0 |
| 19 | 0 | 0 | 0 | 0 | 3 | 3 | 0 | 0 |
| 20 | 0 | 0 | 0 | 0 | 3 | 1 | 0 | 0 |
| 23 | 2 | 1 | 0 | 0 | 3 | 3 | 0 | 2 |
| 24 | 0 | 0 | 0 | 0 | 3 | 0 | 0 | 1 |
| 25 | 0 | 0 | 0 | 0 | 3 | 1 | 1 | 1 |
| 27 | 0 | 0 | 0 | 0 | 3 | 3 | 0 | 0 |
| 28 | 0 | 0 | 0 | 0 | 3 | 3 | 0 | 1 |
| 29 | 0 | 0 | 0 | 1 | 3 | 0 | 0 | 0 |
| 30 | 3 | 0 | 1 | 0 | 3 | 3 | 2 | 3 |
| 31 | 3 | 2 | 2 | 0 | 3 | 3 | 2 | 2 |
| 33 | 1 | 0 | 0 | 0 | 3 | 3 | 2 | 3 |
| 34 | | 0 | 0 | 0 | 3 | 3 | 0 | 0 |
| 35 | 0 | 3 | 0 | 0 | 3 | 3 | 2 | 2 |
| 36 | 0 | 3 | 1 | 1 | 3 | 3 | 3 | 3 |

TABLE 9—Continued

| Compound Number, Tables 1 and 2 | Pre-emergent test | | | | Post-emergent test | | | |
|---|---|---|---|---|---|---|---|---|
| | Lettuce | Tomato | Wheat | Maize | Lettuce | Tomato | Wheat | Maize |
| 37 | 3 | 3 | 0 | 0 | 3 | 3 | 1 | 2 |
| 40 | 0 | 0 | 0 | 0 | 3 | 1 | 0 | 0 |
| 49 | 0 | 0 | 0 | 0 | 3 | 2 | 0 | 0 |
| 51 | 0 | 1 | 0 | 0 | 3 | 3 | 1 | 2 |
| 52 | 1 | 0 | 0 | 0 | 3 | 3 | 1 | 0 |
| 53 | 1 | 0 | 0 | 0 | 3 | 3 | 0 | 1 |
| 54 | 0 | 0 | 0 | 0 | 3 | 3 | 0 | 1 |
| 55 | 0 | 0 | 0 | 0 | 3 | 3 | 0 | 0 |

A further test was also carried out at an application rate equivalent to 5 pounds per acre of active ingredient on a further group of plant species. The test was conducted in the same way as the preceding test; the results, given in Table 10 below, are graded from 0 to 5 where 0 indicates no effect and 5 indicates a complete kill of the plants.

TABLE 10

| Compound number, Table 1 | Pre-emergent test | | | | | | | |
|---|---|---|---|---|---|---|---|---|
| | Sb | Ka | Ca | Pea | On | Bar | Ri | Oat |
| 7 | 0 | 0 | 0 | 5 | 0 | 0 | 0 | 0 |
| | Post-emergent test | | | | | | | |
| 1 | 3 | 0 | 3 | 0 | 0 | 0 | 0 | 0 |
| 3 | 1 | 0 | 2 | 4 | 0 | 0 | 3 | 1 |
| 4 | 0 | 0 | 5 | 0 | 0 | 0 | 0 | 0 |
| 5 | 3 | 2 | 0 | 1 | 0 | 0 | 2 | 0 |
| 7 | 0 | 0 | 2 | 0 | 1 | 0 | 0 | 0 |
| 12 | 3 | 3 | 4 | 1 | 0 | 0 | 0 | 0 |
| 13 | 2 | 2 | 5 | 4 | 0 | 0 | 0 | 0 |
| 14 | 1 | 1 | 3 | 0 | 0 | 0 | 0 | 0 |
| 15 | 2 | 3 | 4 | 4 | 0 | 0 | 0 | 0 |
| 16 | 1 | 1 | 5 | 0 | 0 | 0 | 0 | 0 |
| 19 | 2 | 3 | 4 | 1 | 0 | 2 | 0 | 0 |
| 20 | 0 | 1 | 0 | 0 | 0 | 0 | 0 | 0 |
| 23 | 5 | 3 | 4 | 3 | 0 | 0 | 0 | 1 |
| 24 | 5 | 5 | 5 | 5 | 0 | 5 | 4 | 3 |
| 26 | 5 | 5 | 5 | 5 | 4 | 3 | 0 | 2 |
| 27 | 2 | 1 | 0 | 0 | 0 | 0 | 0 | 0 |
| 28 | 3 | 1 | 0 | 0 | 0 | 0 | 0 | 0 |
| 29 | 5 | 5 | 5 | 5 | 5 | 4 | 3 | 4 |
| 30 | 4 | 4 | 5 | 5 | 4 | 1 | 0 | 1 |
| 31 | 4 | 4 | 3 | 4 | 5 | 3 | 0 | 3 |
| 33 | 5 | 3 | 3 | 1 | 4 | 2 | 0 | 3 |
| 34 | 4 | 4 | 2 | 2 | 1 | 0 | 0 | 1 |
| 35 | 0 | 3 | 3 | 0 | 1 | 0 | 0 | 2 |
| 36 | 5 | 5 | 5 | 5 | 5 | 4 | 3 | 3 |
| 37 | 5 | 4 | 4 | 4 | 3 | 5 | ---- | 0 |
| 39 | 4 | 5 | 5 | 3 | 4 | 1 | 0 | 1 |
| 51 | 5 | 4 | 4 | 4 | 5 | 1 | 1 | 1 |
| 52 | 2 | 2 | 0 | 1 | 0 | 0 | 0 | 0 |
| 53 | 2 | 5 | 4 | 1 | 0 | 1 | 0 | 1 |
| 54 | 4 | 4 | 5 | 1 | 2 | 1 | 0 | 0 |
| 55 | 4 | 1 | 5 | 0 | 0 | 1 | 0 | 0 |

The abbreviations used in the above table have the following meanings.

Abbreviation: Plant
- Sb — Sugar beet.
- Ka — Kale.
- Ca — Cabbage.
- On — Onion.
- Bar — Barley.
- Ri — Rice.

These results clearly show that the best herbicidal action is obtained when the compounds are applied after the plants have emerged, and also that the majority of the compounds are selectively toxic to broad-leaved dicotyledonous plants.

What is claimed is:

1. A compound having the formula:

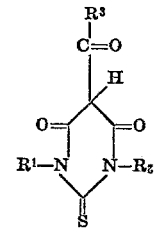

wherein $R^1$ and $R^2$ represent alkyl of up to 6 carbon atoms or allyl, and $R^3$ represents an alkyl of 2 to 9 carbon atoms.

2. The compound 1,3-dimethyl-5-isobutyryl-2-thiobarbituric acid.

3. The compound 1-methyl-3-n-propyl-5-valeryl-2-thiobarbituric acid.

4. The compound 1,3-dimethyl-5-valeryl barbituric acid.

5. The compound 1,3-dimethyl-5-isobutyrylbarbituric acid.

References Cited

UNITED STATES PATENTS

| | | | |
|---|---|---|---|
| 3,250,776 | 5/1966 | Friedlander et al. | 260—260 |
| 3,270,019 | 8/1966 | Friedlander et al. | 260—257 |
| 3,679,683 | 7/1972 | Gorbaty | 260—257 |
| 3,674,782 | 7/1972 | Eldredge et al. | 260—257 |

OTHER REFERENCES

Berichte, 54, 1046–1058 relied on (1921).
Berichte, 15, 2844–2845 relied on (1882).

DONALD G. DAUS, Primary Examiner

A. M. T. TIGHE, Assistant Examiner

U.S. Cl. X.R.

71—92; 260—242, 260; 424—251, 254